United States Patent
Roriz (10) Patent No.: US 11,795,818 B2
(45) Date of Patent: Oct. 24, 2023

(54) METHOD FOR IDENTIFYING GEOLOGICAL AND DRILLING PATTERNS IN A UNIDIMENSIONAL SPACE VIA PERIODIC ORTHOGONAL FUNCTIONS APPLIED TO DRILLING PARAMETER DATA

(71) Applicant: Petróleo Brasileiro S.A.—Petrobras, Rio de Janeiro (BR)

(72) Inventor: Carlos Eduardo Dias Roriz, Niterói (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 244 days.

(21) Appl. No.: 17/358,743

(22) Filed: Jun. 25, 2021

(65) Prior Publication Data
US 2021/0404329 A1 Dec. 30, 2021

(30) Foreign Application Priority Data
Jun. 26, 2020 (BR) ........................ 10 2020 0132199

(51) Int. Cl.
*E21B 49/00* (2006.01)
*E21B 47/04* (2012.01)
*G06F 18/2135* (2023.01)

(52) U.S. Cl.
CPC ............ *E21B 49/003* (2013.01); *E21B 47/04* (2013.01); *G06F 18/2135* (2023.01); *G06F 2218/02* (2023.01)

(58) Field of Classification Search
CPC .... E21B 49/003; E21B 47/04; G06F 18/2135; G06F 2218/02
See application file for complete search history.

(56) References Cited

FOREIGN PATENT DOCUMENTS

WO 2015057099 A1 4/2015
WO WO-2015057099 A1 * 4/2015 ............. E21B 10/00
(Continued)

OTHER PUBLICATIONS

ETH ZUrich, Swizerland. Department of Mathematics and Statistics, Queen's University, Kingston, Canada . . . Paul Embrechts and Agnes M. Hezberg "Variations of Andrews' Plots" (Year: 1972).*
(Continued)

*Primary Examiner* — Michael J Dalbo
*Assistant Examiner* — Kaleria Knox
(74) *Attorney, Agent, or Firm* — Mintz Levin Cohn Ferris Glovsky and Popeo, P.C.

(57) ABSTRACT

The present invention relates to a technique for identifying geological and drilling patterns by analyzing data from drilling parameters, using periodic orthogonal functions applied to such data. The use of averages to convert time data to depth data acts as a low-pass filter, attenuating the textural information from the torque data. Therefore, with the use of simple statistical filters combined with the use of multidimensional data visualization methods, it is possible to discretize drilling and geological patterns in the depth data acquired, aiding in the characterization of the top of the pre-salt carbonate reservoir, minimizing the geological and engineering risk in these operations. It is noted that in some situations of well kill, it is common not to have perceptible contrasts when analyzing the drilling parameters in the transition between the basal anhydrite and the carbonates, with the use of techniques such as PCA (Principal Components Analysis) being necessary in order to increase the method's power of discrimination. The technique disclosed minimizes the exploratory risks in pre-salt kill situations, as it allows precise characterization of the top of the carbonate reservoir.

7 Claims, 5 Drawing Sheets

(56) References Cited

FOREIGN PATENT DOCUMENTS

| WO | 2016108915 | A1 | | 7/2016 | | |
|---|---|---|---|---|---|---|
| WO | 2017132098 | A1 | | 8/2017 | | |
| WO | WO-2017132098 | A1 | * | 8/2017 | ......... | E21B 41/0092 |

OTHER PUBLICATIONS

Edward J.Wegman "three-Dimensional Andrews Plots and the grand Tour", pp. 1-4 (Year: 1993).*
D.F.Andrews "Plots of high-Dimensional Data" (Mar. 1972), vol. 28, No. 1, pp. 125-136 (Year: 1972).*
Khattree & Naik (Khattree, R .; Naik, D. N. Andrews Plots for Multivariate Data: some new Suggestions and Applications. Journal of Statistical Planning and Inference, 100:411-425, 2002 (Year: 2002).*
Andrews D.F. (Mar. 1972) "Plots of High Dimensional Data", Biometrics, 28:125-136.
Embrechts et al. (Aug. 1991) "Variations of Andrews' Plots", International Statistical Review, 59(2):175-194.
Khattree et al. (Feb. 1, 2002) "Andrews Plots For Multivariate Data: Some New Suggestions And Applications", Journal of Statistical Planning and Inference, 100(2):411-425.
Wegman et al. (Jan. 1993) "Three-Dimensional Andrews Plots and the Grand Tour", Computing Science and Statistics, 25:284-288.

* cited by examiner

METHOD FOR IDENTIFYING GEOLOGICAL AND DRILLING PATTERNS IN A UNIDIMENSIONAL SPACE VIA PERIODIC ORTHOGONAL FUNCTIONS APPLIED TO DRILLING PARAMETER DATA

CROSS-REFERENCE TO RELATED APPLICATIONS

This application claims priority to Brazilian Application No. 1020200132199, filed on Jun. 26, 2020, and entitled "METHOD FOR IDENTIFYING GEOLOGICAL AND DRILLING PATTERNS IN A UNIDIMENSIONAL SPACE VIA PERIODIC ORTHOGONAL FUNCTIONS APPLIED TO DRILLING PARAMETER DATA," the disclosure of which is incorporated herein by reference in its entirety.

FIELD OF THE INVENTION

The present invention relates to a technique for identifying geological and drilling patterns by analyzing drilling parameter data, used in the area of geology and engineering, using a specific processing routine applied to these data, and using periodic orthogonal functions, with the primordial function of allowing more robust interpretation of the drilling parameters by identifying patterns in generated time and depth ranges.

DESCRIPTION OF THE STATE OF THE ART

In the activities of acquiring data during well drilling while prospecting for hydrocarbons, even with recent technological advances the operations that involve killing a well at the top of the pre-salt carbonate reservoirs still present an operating scenario that is potentially extremely risky. Due to the lack of seismic resolution, it is not possible to precisely predict the top of the reservoir. When entering a well's scale, the LWD (Logging While Drilling) tools that comprise the drilling string play an important role, as they allow the geologist to identify the different lithologies and tops of formations crossed, aiding in well kills. No LWD tools available today under contract at Petrobras have the capacity to take measurements at the position of the drill bit. In the best case, the gamma ray tools near the drill bit capture, on average, measurements at an approximate distance of 3 m from the bottom of the well. Nevertheless, gas data, such as trough samples collected during drilling also have limits, as they can only be analyzed after waiting the time it takes for the drilling fluid to return to the surface, on average from three to four hours per circulation event.

However, the drilling parameter data are acquired instantaneously, as the drilling advances. These data, acquired by sensors on the surface coupled to the drilling system, tend to reflect the lithological changes and/or formation changes as the drilling advances, that is, in real time. The temporary resolution of this data is very high, generally one second per parameter measured, allowing analysis of lithological variations and mechanical characteristics of the rock crossed along the path of the well.

Thus, correct interpretation of these parameters is extremely important in well kill operations. However, the time-drilling parameter data acquired by mudlogging/drilling companies are generally underused in the industry, either because of the difficulty in adequately visualizing the data or due to the difficulty in analysis and interpretation. The majority of professionals involved in interpreting this data generally use the data already converted from time to depth in their analyses. In this time-depth conversion process, the textural information included in the data are attenuated, mainly torque, as the use of averages for establishing the depth data functions as a low-pass filter. Additionally, as numerous drilling parameters are used, the series of ideas and the integration with seismic data, LWD profiles, gases, and trough samples is highly complex.

Graphic representations of multidimensional data are an important tool in exploratory analysis of data. Unfortunately, the majority of the graphic methods available allow projection of these data in few dimensions, which makes it very difficult to interpret them. Andrews (Andrews, D. F. Plots of High Dimensional Data. *Biometrics*, 28:125-136, 1972) proposes a method, using the Fourier finite series as the basis to unidimensionally represent, continuously in space, a multidimensional data set in the form of functions. The technique proposed by this author preserves some of the statistical properties (e.g. average, variance, distance), which allows peculiar characteristics of the data to be identified after its transformation. The technique of graphic representation proposed by Andrews consists of projecting the vector $X=(x_1, x_2, x_3, x_4, \ldots, x_k)$ on the stipulated Fourier basis (eq. 1 and 2). The projection in this unidimensional space may show groupings, outliers, or other peculiarities of the data that occur in the subspace, and which in other dimensions might not be revealed. The advantage of this projection is the fact that it is continuous in the unidimensional space. Thus, the calculated curves simultaneously show all the possible projections of X on the Fourier basis for the different values of t limited between $-\pi < t < \pi$. The Fourier basis stipulated by Andrews (1972) is defined by equations 1 and 2. If the number of dimensions (k) is even, we have equation 1:

$$f_x(t) = \frac{x_1}{\sqrt{2}} + x_2 \cdot \sin(t) + x_3 \cdot \cos(t) + x_4 \cdot \sin(2t) + x_5 \cdot \cos(2t) + \ldots + x_{k-1} \cdot \sin\left(\frac{(k-1)}{2}.t\right) + x_k \cdot \cos\left(\frac{(k-1)}{2}.t\right).$$

If the number of dimensions (k) is odd, we have equation 2:

$$f_x(t) = \frac{x_1}{\sqrt{2}} + x_2 \cdot \sin(t) + x_3 \cdot \cos(t) + x_4 \cdot \sin(2t) + x_5 \cdot \cos(2t) + \ldots + x_k \cdot \sin\left(\frac{(k)}{2}.t\right).$$

Figure 1:
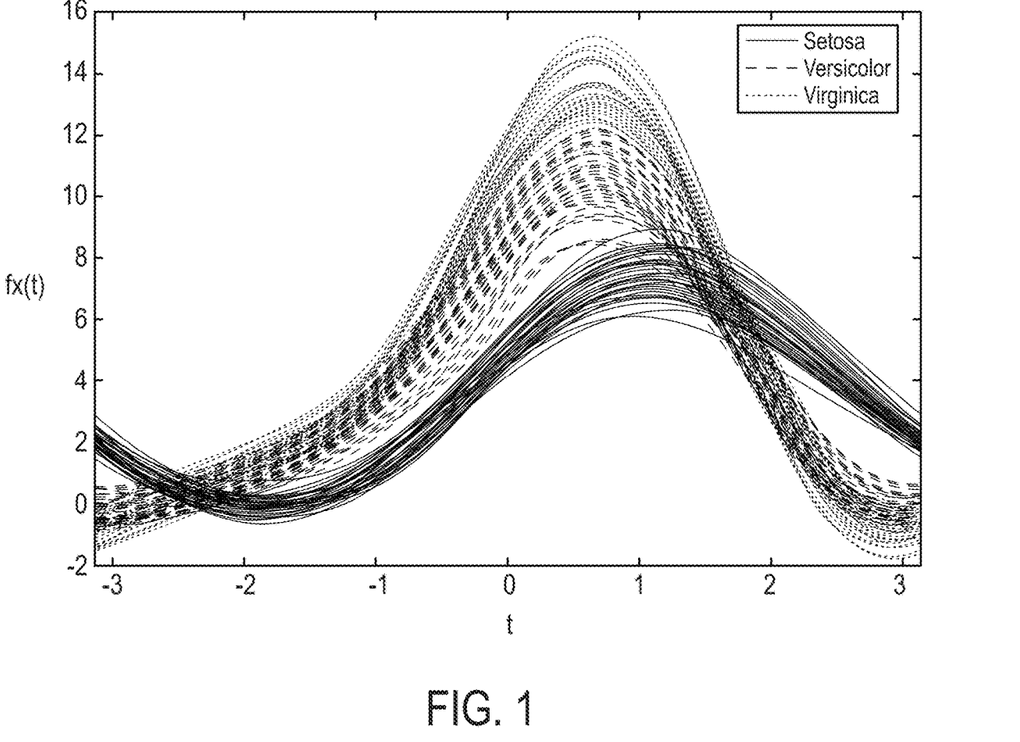
FIG. 1 shows application of the Andrews technique (1972) to the data set Iris Flower Data Set where all possible projections of fx(t), with t varying between $-\pi < t < \pi$, are shown simultaneously.

In order to show Andrews' proposal in the 1972 article, the function fx(t) was applied to the data set, widely disseminated in the literature and in the public domain, known as the Iris Flower Data Set. These data were collected by Edgar Anderson to quantify the morphological variations of the iris flower (vulgarly known as iris) of three different species: setosa, versicolor and virginica. This data set consists of 150 records with five different attributes: petal length (xcp), petal width (xlp), sepal length (xcs), sepal width (xls) and species, that is, X=[xcp, xlp, xcs, xls]. The projection of this matrix X on the stipulated trigonometric basis, or simply the application of fx(t), is shown in FIG. 1. As the data set used in the analysis presents four dimensions, that is, k is even, equation 1 was used to project the data in this unidimensional space.

The calculated curves simultaneously showed all possible projections of the data in fx(t), for t varying between $-\pi < t < \pi$. By projecting X along t, it is possible to discretize a species of the other two, the most apparent separation being between t=[−2, 1] and t>2. If the projection of X were only considered in the positions of t=−2.5 and t=1.5, for example, it would not be possible to differentiate between the three species. By working with the drilling parameter data, the principal form of showing fx(t) is in the form of an image interpolated along the axis of the well's depth, as it allows integration with the other data acquired during drilling of the well, which will be duly presented.

The PCA technique (Principal Components Analysis) may also be applied directly to $X=[x_{cp}, x_{lp}, x_{cs}, x_{ls}]$ with the objective of extracting a new set of variables not linearly correlated, in order to better individualize the different groupings. In well kill situations at the top of pre-salt reservoirs, the transition between anhydrite and carbonate is often not easy to perceive when analyzing the drilling parameters, thus using the PCA technique on the data before being used in fx(t) is necessary (equations 1 and 2).

Khattree & Naik (Khattree, R.; Naik, D. N. Andrews Plots for Multivariate Data: some new Suggestions and Applications. *Journal of Statistical Planning and Inference*, 100: 411-425, 2002.), Embrecht & Hezberg (1991), Wegman & Shen (Wegman, E. J.; Shen, J. Three-Dimensional Andrews Plots and the Grand Tour. *Computing Science and Statistics*, 25:284-288, 1993.) also presented other proposals for projecting multidimensional data, all of which may be applied to drilling parameter data. Document WO2016108915A1 relates to a system and method of visualizing data from formation sensors, placed radially, coupled to a drill bit in a well drilling system. The sensors may be coupled to any adequate drill bit, such as a roller cone bit or a fixed-cutter bit, in a radius from the center of the drill bit. The radially placed sensors may be tilted to measure principally the formation on the face of the drill bit or in front of the drill bit, and they may collect data associated with the properties of the formation that is being drilled, such as gamma ray radiation and resistivity of the formation. Data from the sensors may be collected and associated with the angle at which the data was collected, and the data from each drill bit sensor may then be compiled in memory compartments based on the associated angles at which the data was collected. The data may then be seen and shown in a manner that is significant for an operator of a downhole drilling system, or for an automated direction system, such that drilling decisions, such as the direction of the borehole, can be properly made. For example, the data can be seen in relation to a composition of the formation estimated in some embodiments. Visualization may be in two or three dimensions in certain embodiments. In particular embodiments, visualization may be animated, showing changes in the data from the formation sensor over time, as the borehole is being drilled. Although the document reveals the use of sensors in drilling operations, it does not cite use of orthogonal functions. The document also does not reference the precise analysis of the drilling data, or the definition of entry variables.

Document WO2017132098A1 relates to a method and system that drills a well and crosses a geological formation using an LWD tool, which involves deriving various formation models that characterize the geological formation. The number of formation models represents layer structures with one or more layers or limits shifted vertically at varying distances above or below the LWD tool, as well as a heterogeneity (such as a fault) shifted laterally at varying distances in relation to the position of the LWD tool. The simulated directional resistivity data of the LWD tool are derived based on the number of formation models. Certain simulated directional resistivity data derived from the number of formation models are combined or selected to be processed as multidimensional crossed plotting data. Certain pairs of simulated directional resistivity data derived from the number of formation models may be combined or selected to be processed as bidimensional crossed plotting data. In another example, certain N tuples of simulated directional resistivity data derived from the number of formation models may be combined or selected to be processed as N-dimensional crossed plotting data, where N is an integer greater than three. Despite also revealing a method for predicting drilling patterns, it does not reveal the use of orthogonal functions, nor the use of static filters, or of entry variables for better interpretation of the drilling parameters.

Document WO2015057099A1 relates to systems, apparatuses and methods for predicting how easily a rock can be drilled based on electromagnetic emission measurements (EEM) during a drilling operation. One embodiment includes an apparatus (for example, a downhole assembly or drill bit assembly) to obtain EEM measurements emitted during drilling, which includes sensors to measure different EM radiation frequencies, as well as an electricity current induced by destruction of rocks during drilling. One embodiment includes a predictive mathematical model of drilling rock that calculates drilling parameters (for example, drill bit wear in relation to the penetration rate) based on entry parameters, such as formation parameters, drilling assembly parameters, operational parameters, and measured EEM data. One example is a neural network model configured to project drilling capacity based on entry parameters that include EEM measurements. Entry parameters, including EEM measurements taken during a drilling operation, may be measured and processed for subsequent drilling operations, or they may be processed in real time to provide drilling capacity predictions during drilling. The surface and downhole units provide entry data for a neural network model that includes data, instructions, and appropriate information for providing predictive drilling capacity data to a user or controller. The neural network includes an algorithm to estimate or predict drilling capacity based on data measured, and other entry data that describe the drilling operation, the drilling assembly, and the ground. The document reveals a technique for identifying geological and drilling patterns by analyzing drilling parameters, however, it does not reveal the use of periodic orthogonal functions applied to the drilling parameters, nor does it detail the algorithm used, or simple statistical filters combined with the use of multidimensional data visualization methods.

The present invention relates to a technique to identify geological and drilling patterns by processing drilling parameter data, acquired by sensors coupled to the drilling (probe) systems and/or downhole sensors that descend with the drilling column, with different characteristics that provide advantages over what is revealed by the documents in the state of the art.

SUMMARY DESCRIPTION OF THE INVENTION

The present invention relates to a technique to identify geological and drilling patterns by processing data on drilling parameters, using periodic orthogonal functions (Andrews, 1972) applied to such data. The use of averages to convert time data to depth data acts as a low-pass filter, attenuating the textural information from the torque data.

Therefore, with the use of simple statistical filters combined with the use of multidimensional data visualization methods, it is possible to discretize drilling and geological patterns in the time data acquired, and subsequently projected for depth, aiding in the characterization of the top of the pre-salt carbonate reservoir, minimizing the geological and engineering risk in these operations. It is noted that in some well kill situations it is common not to have perceptible contrasts when analyzing the drilling parameters in the transition between the basal anhydrite and the carbonates, with the use of techniques such as PCA being necessary in order to increase the method's power of discrimination. The presented technique minimizes the exploratory risks in pre-salt kill situations, as it allows precise characterization of the top of the carbonate reservoir.

OBJECTIVES

The objective of the present invention is to allow a more robust interpretation of time and depth drilling parameters.

The objective of the present invention is to minimize the geological and engineering risks.

It is also an objective of the present invention to ensure isolation of all mobile salts present in the evaporite section by the intermediate coating that precedes the drilling of the reservoir phase.

Another objective of the present invention is to reduce a company's financial losses and prevent well abandonment.

The objective of the present invention is to avoid unnecessarily drilling many meters inside a carbonate reservoir, reducing the risk of occurrence of severe losses, due to the heavy weight of fluid used to drill the evaporite section. In situations in which the reservoir presents high bore pressure, it is also fundamental to drill a few meters inside the reservoir, minimizing the risk of kicks.

These and other objectives will be attained by the purpose of the present invention.

BRIEF DESCRIPTION OF THE DRAWINGS

The present invention will be described in greater detail below, referencing the attached figures, which clearly and without limitation on the inventive scope, present the results obtained. The drawings show.

DETAILED DESCRIPTION OF THE INVENTION

First, it is noted that the following description will begin with preferred embodiments of the invention. As will be apparent to anyone skilled in the art, however, the invention is not limited to those particular embodiments.

Figure 2:
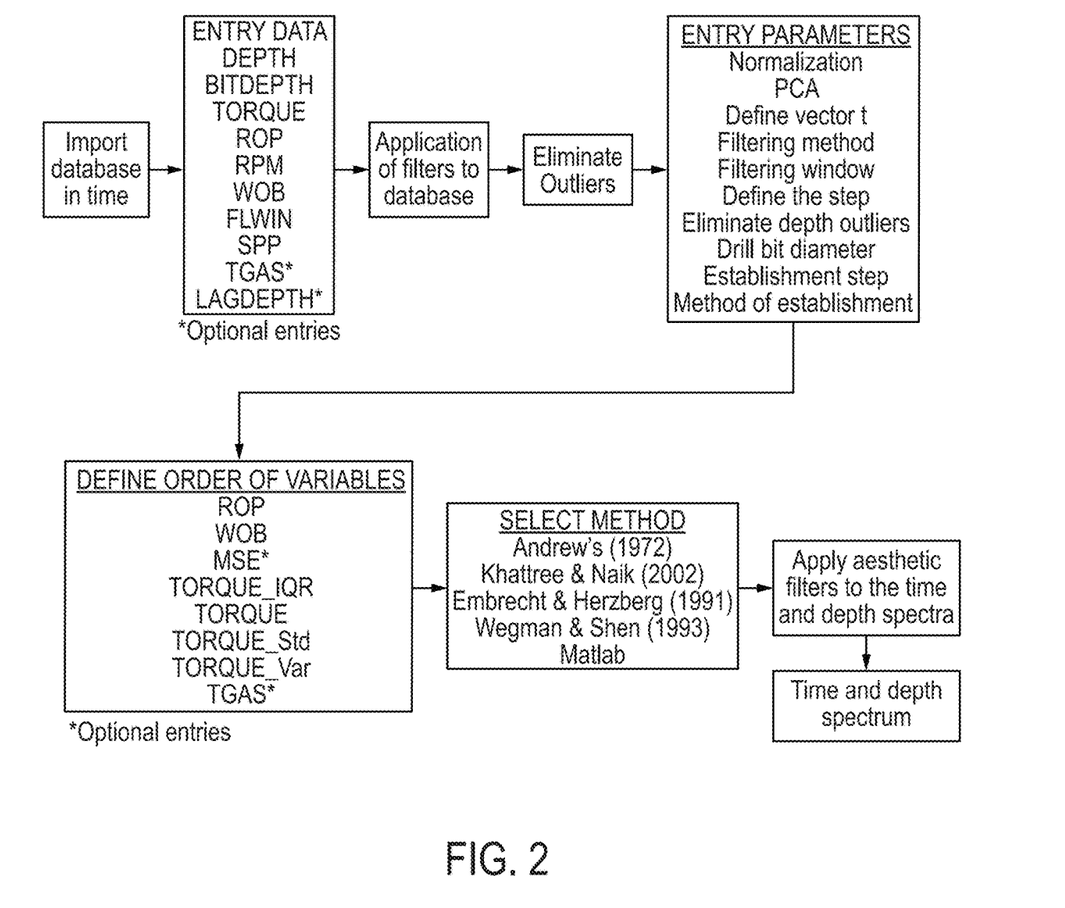
FIG. 2 shows a flow chart with the routine for processing drilling parameter data implemented for generation of time and depth ranges, which will be described in detail below.

The processing routine implemented and applied to time acquired drilling parameter data, is briefly described below: 1) Define the entry variables: MD (Well Depth), MDBIT (Drill Bit Depth), TORQUE, RPM (rotation of drilling string), WOB (Weight on Bit), FLWIN (Inflow), SPP (Injection Pressure), ROP (Rate of Penetration), TGAS (Total Gas, optional) and MDLAG (Gas Return Depth, optional). The MDLAG variable is necessary to synchronize the TGAS data with the time-drilling parameter data; 2) Filter the time records in order to only keep events with drilling status in the database; 3) Eliminate the time data outliers by using specific algorithms, minimizing the influence of these atypical values on the following calculations; 4) Choice of function for calculating fx(t) (options: Andrews (1972), Khattree & Naik (2002), Embrecht & Hezberg (1991), Wegman & Shen (1993)); 5) Standardize (for average zero and standard deviation of one) the time acquired drilling parameter data and used in the calculations of fx(t); 6) Define the window for applying the filters to capture the textural information from the torque data (interquartile distance, standard deviation, and variance); 7) Define the order and the variables that will be used for entry in the model to calculate fx(t); 8) Calculate the PCA (optional); 9) Define the step for establishing fx(t) from time to depth (options: step from 1 or 0.5 m); 10) Define the method for establishing fx(t) (options: average or median); 11) Remove outliers from the depth data (optional); 12) Apply aesthetic filters and define the numerical parameters for exhibiting the time and depth ranges of fx(t). An important point in relation to the processing routine is the fact that the TGAS variable was not used as an entry in the model, although it is available for such use. Use of TGAS was not chosen because in well kill operations an independent valuation of the trinomial parameters of drilling, gases, and trough samples is fundamental. An adequate assessment of this trinomial is essential for building the deductive model that will lead a geologist to indicate whether or not to enter the top of the carbonate reservoir. Therefore, the matrix used in calculating fx(t) in the examples described below was defined as X=[ROP, WOB, MSE (Mechanical Specific Energy), TORQUE_iqr, TORQUE, TORQUE_std, TORQUE_var] where the variables TORQUE_iqr, TORQUE_std, TORQUE_var correspond to the interquartile distance, standard deviation, and variance of the torque, respectively. The variables MSE, TORQUE_iqr, TORQUE_std and TORQUE_var are calculated from the entry parameters. In the study in question, the decision was made to follow the recommendations of Embrechts & Herzberg (Embrechts, P.; Herzberg, A. M. Variations of Andrews' Plots. *International Statistical Review*, 59(2):175-194, 1991) in which these authors propose grouping the highly correlated variables and placing those considered to have the higher discriminating potential in the extreme frequencies of sines and cosines. FIG. 2 shows the flow chart used as the routine for processing drilling parameter data for generating time and depth ranges. In the present invention, we will only deal with depth ranges.

Figure 3:
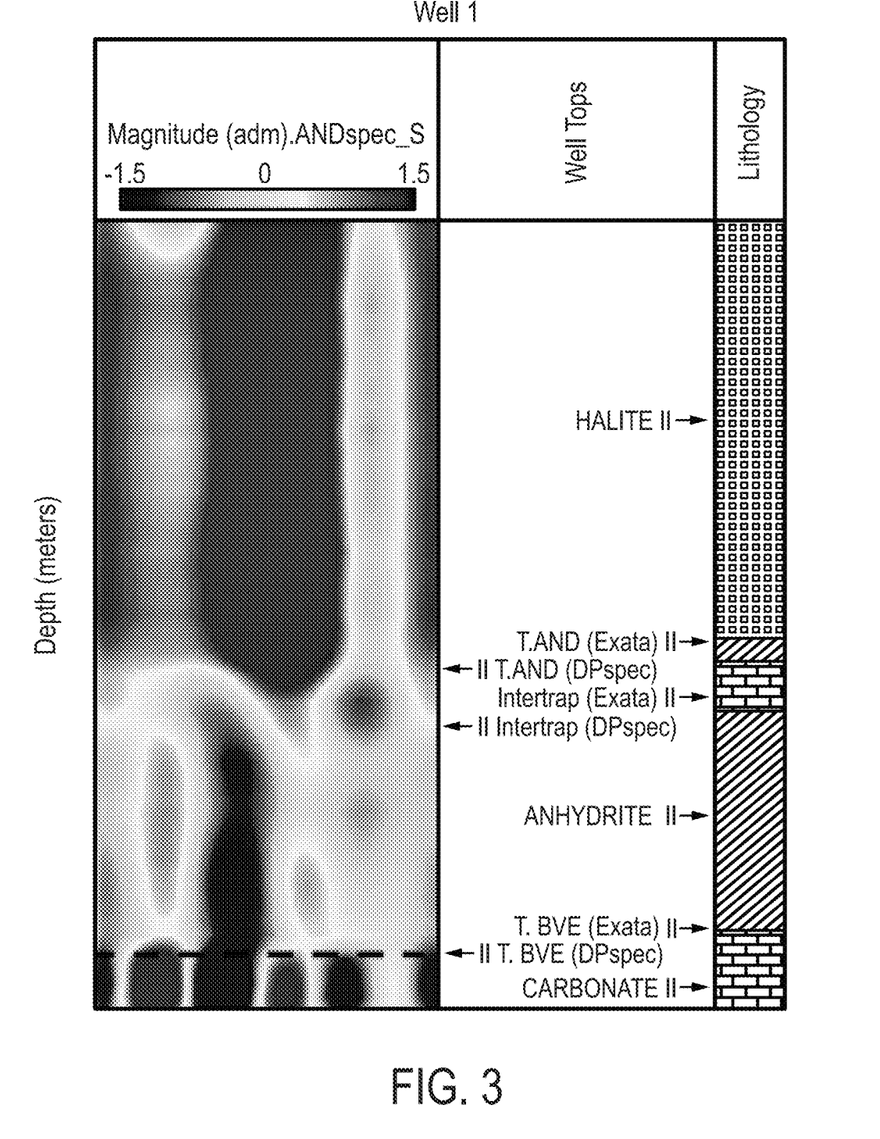
FIG. 3 shows the result of using the method in Well 1, shown as an interpolated image (track 1), geological tops/lithological descriptions (track 2) and interpreted lithology taken from the Exata database system (Petrobras) (track 3). The technique allowed the four lithological groupings (halite, anhydrite, intertrap carbonate, and pre-salt carbonate) found in Well 1 to be individualized.
Figure 4:
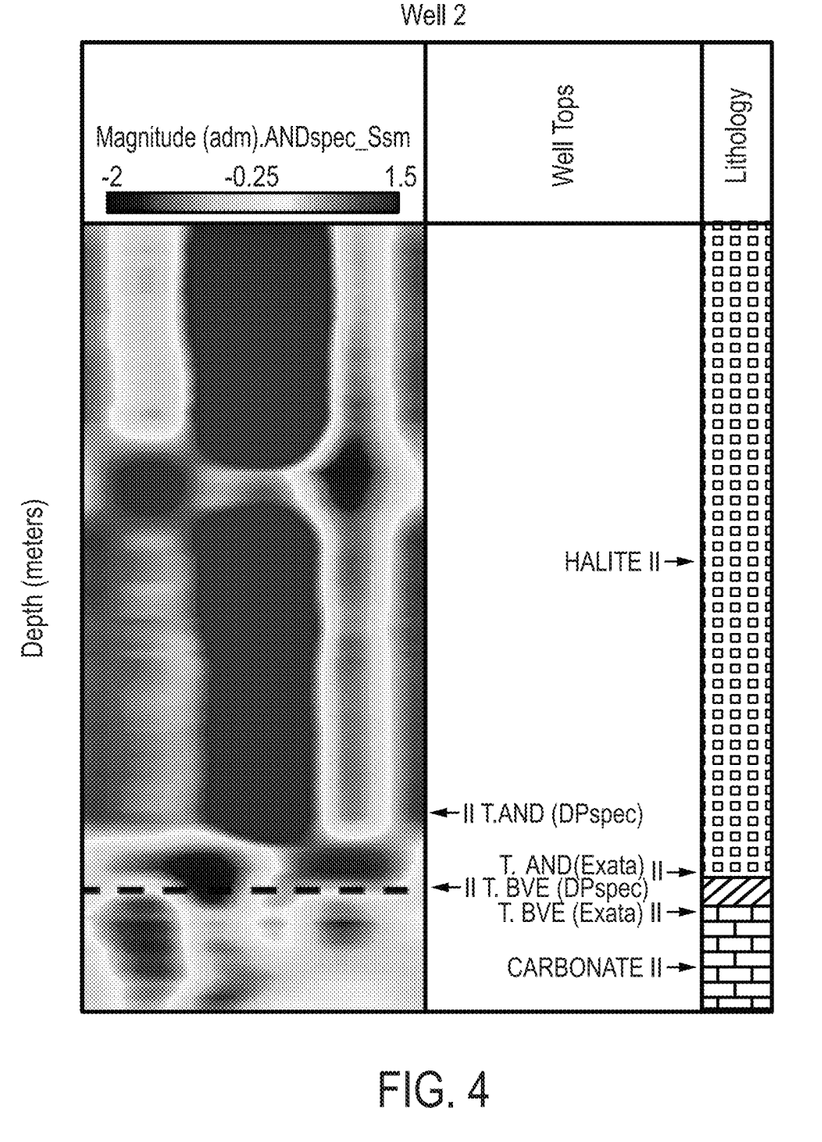
FIG. 4 shows the result of using the method in Well 2, shown as an interpolated image (track 1), geological tops/lithological descriptions (track 2) and interpreted lithology taken from the Exata database system (Petrobras) (track 3). The technique allowed the three lithological groupings (halite, anhydrite, and pre-salt carbonate) found in Well 2 to be individualized.
Figure 5:
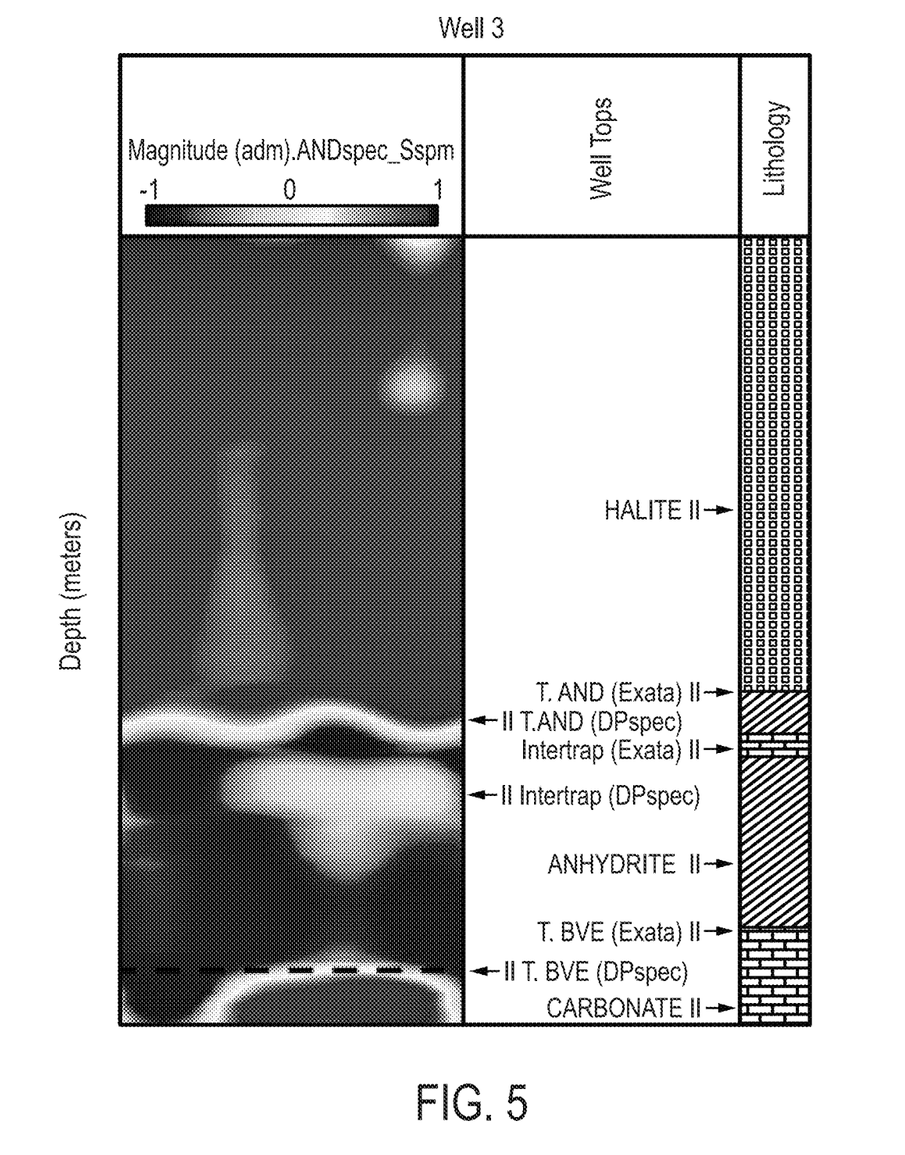
FIG. 5 shows the result of using the method in Well 3, shown as an interpolated image (track 1), geological tops/lithological descriptions (track 2) and interpreted lithology taken from the Exata System database (Petrobras) (track 3). In the case of Well 3, use of the PCA technique was necessary, which increased the discriminating power of the method, allowing the three [sic] lithological groups (halite, anhydrite, intertrap carbonate and pre-salt carbonate) found in Well 3 to be individualized.

The method described above was applied to three wells drilled in the pre-salt in Santos Basin, called Well 1, Well 2, and Well 3. In all three wells, the technique allowed precise characterization of the top of the reservoir, as shown in FIGS. 3, 4 and 5 attached, proving the robustness of the method in well kill operations (track 1). In the case of Well 3, use of the PCA technique was necessary, in order to increase the discriminating power of the method. This allowed individualizing the different lithologies passed through in the well. The tops identified in the three wells from the proposed method are indicated in track 2 of FIGS. 3, 4 and 5, by the abbreviations T. AND (DPspec) (basal anhydrite top), Intertrap (DPspec) (intertrap carbonate), T. BVE (DPsec) (top of the pre-salt carbonate in the Barra Velha Formation). In track 2, these same tops are also indicated, interpreted by the geologist in the field/probe, and that they are available in the (Petrobras) Exata System database (T. AND (Exata), Intertrap (Exata) (intertrap carbonate), T. BVE (Exata)). In track 3, the lithologies passed through (halite, anhydrite and carbonate) in the three wells are indicated.

The invention claimed is:

1. A method for identifying geological and drilling patterns in a unidimensional space via periodic orthogonal functions applied to drilling parameter data, the method comprising:
    defining, as entry variables, well depth (MD), drill bit depth (MDBIT), torque (TORQUE), rotations per minute of the drilling string (RPM), weight on bit (WOB), inflow (FLWIN), injection pressure (SPP), and rate of penetrations (ROP);
    filtering time records and only keeping events with a status of drilling in a database;
    eliminating outliers of time data;
    choosing a function for calculating fx(t);
    standardizing time acquired drilling parameter data and using the standardized time to calculate fx(t);
    defining a window for using filters to capture textural information from torque data;
    defining a step for establishing time fx(t) to depth of 1 m or 0.5 m;
    defining the method for establishing fx(t) between average or median;
    using aesthetic filters and defining numerical parameters to show the time and depth ranges of fx(t);
    determining fx(t); and
    entering the carbonate reservoir based on the determined fx(t) or killing a well based on the determined fx(t).

2. The method of claim 1, comprising calculating principle component analysis (PCAs) based upon the entry variables.

3. The method of claim 1, comprising removing outliers from depth data.

4. The method of claim 1, wherein a matrix used in calculating fx(t) is defined by X=[ROP, WOB, mechanical specific energy (MSE), interquartile distance of torque (TORQUE_IQR), TORQUE, standard deviation of torque (TORQUE_STD), variance of torque (TORQUE_VAR)].

5. The method of claim 1, wherein at least one of MSE, total gas (TGAS) and gas return depth (MDLAG) is used as an entry variable.

6. The method of claim 5, wherein the MDLAG is used to synchronize the TGAS data with the drilling parameters.

7. The method of claim 1, wherein the textural information from the torque data comprises interquartile distance of torque (TORQUE_IQR), standard deviation of torque (TORQUE_STD), and variance of torque (TORQUE_VAR).

* * * * *